US008176006B2

(12) United States Patent
Lin et al.

(10) Patent No.: US 8,176,006 B2
(45) Date of Patent: May 8, 2012

(54) MAINTAINING AND DISTRIBUTING RELEVANT ROUTING INFORMATION BASE UPDATES TO SUBSCRIBING CLIENTS IN A DEVICE

(75) Inventors: Minjie Lin, Sunnyvale, CA (US); Rayen Mohanty, Sunnyvale, CA (US); Lorenzo Vicisano, Oakland, CA (US); Paul Arthur Jensen, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 1644 days.

(21) Appl. No.: 10/733,016

(22) Filed: Dec. 10, 2003

(65) Prior Publication Data

US 2005/0131912 A1    Jun. 16, 2005

(51) Int. Cl.
*G06F 17/30* (2006.01)
(52) U.S. Cl. .................. 707/609; 707/636; 707/687
(58) Field of Classification Search .............. 707/10, 707/201
See application file for complete search history.

(56) References Cited

U.S. PATENT DOCUMENTS

| 6,067,573 | A | 5/2000 | Tam et al. | |
|---|---|---|---|---|
| 6,567,380 | B1 | 5/2003 | Chen | |
| 6,665,711 | B1 * | 12/2003 | Boyle et al. | 709/219 |
| 6,938,095 | B2 * | 8/2005 | Basturk et al. | 709/238 |
| 6,952,740 | B1 * | 10/2005 | Cain et al. | 709/238 |
| 7,633,874 | B1 * | 12/2009 | Nalawade et al. | 370/238 |
| 2003/0105800 | A1 * | 6/2003 | Cullen | 709/201 |
| 2003/0223425 | A1 * | 12/2003 | Shenoy et al. | 370/394 |
| 2004/0040021 | A1 * | 2/2004 | Bharati et al. | 717/170 |
| 2004/0132451 | A1 * | 7/2004 | Butehorn et al. | 455/445 |
| 2006/0259625 | A1 * | 11/2006 | Landfeldt et al. | 709/227 |

FOREIGN PATENT DOCUMENTS

| EP | 0 426 911 A1 | 5/1991 |
|---|---|---|
| WO | 01/06732 A1 | 1/2001 |

OTHER PUBLICATIONS

XORP Routing Information Base (RIB) Process, Version 0.1, XORP Project, International Computer Science Institute, Berkeley, CA, Dec. 11, 2002.

XORP Routing Information Base (RIB) Process, Version 0.4, XORP Project, International Computer Science Institute, Berkeley, CA, Aug. 28, 2003.

(Continued)

*Primary Examiner* — Debbie Le
(74) *Attorney, Agent, or Firm* — The Law Office of Kirk D. Williams

(57) ABSTRACT

Route changes are processed and filtered to notify a client of those routing updates of interest to a client. In one configuration, a set of network addresses are received from a client indicating route updates of interest to the client and a set of types of routing changes that are of interest. One or more data structures are accordingly populated with this information. In response to receiving a route update, one or more lookup operations are performed on the data structure to identify whether this particular route is of interest to a particular client and/or whether any route dependent on the particular route are of interest to a client. The client is notified of the changes of interest. In one embodiment, the type of change to a route is also matched against a set of types of routing changes that are of interest, and a client is only notified if the change to a route of interest also matches a type of routing change of interest.

23 Claims, 11 Drawing Sheets

OTHER PUBLICATIONS

Candian Intellectual Property Office, Office action, Application No. 2,546,542, "Distributing Relevant Routing Information Base Updates to Subscribing Clients in a Device," dated Dec. 8, 2010.
Applicant's Response to Office Action, , Application No. 2,546,542, "Distributing Relevant Routing Information Base Updates to Subscribing Clients in a Device," dated Jun. 8, 2011.

European Patent Office, Search Report, Application No. 04789356.5-1249 dated Sep. 17, 2010.
European Patent Office, Examination Report, Application No. 04 789 356.5-1249 dated Jan. 19, 2011.
Applicant's Response to Examination Report, Application No. 04 789 356.5-1249 dated May 23, 2011.

* cited by examiner

ADDING AN ADDRESS OF INTEREST

REMOVING AN ADDRESS OF INTEREST

NOTIFYING CLIENT(S) OF ROUTE UPDATES OF INTEREST

MAINTAINING AND DISTRIBUTING RELEVANT ROUTING INFORMATION BASE UPDATES TO SUBSCRIBING CLIENTS IN A DEVICE

TECHNICAL FIELD

One embodiment of the invention relates to communications and computer systems, especially routers, packet switching systems, and other devices; and more particularly, one embodiment relates to maintaining distributing relevant routing information base updates to subscribing clients in a device, such as, but not limited to a router, packet switching, or other communication and/or computing device.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Scalability and performance are extremely important features for routers, especially as Internet traffic increases. The Routing Information Base (RIB) is an essential software component on a router system. It maintains a database of routes from various routing protocols and serves as a central source of routing information for its clients including the Forwarding Information Base (FIB), unicast routing protocols like Open Shortest Path First (OSPF), Intermediate System-Intermediate System (IS-IS), and multicast routing protocols like Protocol Independent Multicast (PIM), Multicast Source Discovery Protocol (MSDP). The RIB provides an interface for clients to receive all updated routes as well as for clients to query the RIB for specific routes and to receive corresponding routing results, as illustrated in FIG. 1. Examples of such routing queries include looking up the nexthop address and interface to reach a destination, and obtaining the best source address to use when sending a packet.

Protocols like PIM, BGP need up-to-date routing information to operate. For example, PIM needs to track changes to unicast reachability information for every unicast IP address in its multicast topology table (i.e., the root nodes for the multicast distribution trees). The faster PIM learns about a change the less time it takes for multicast to converge. Polling the RIB is one possibility for tracking the required changes. However, this leads to inefficient computation and high latencies for propagation of changes, particularly for large scale applications. Also, polling of the RIB to extract the required routes from the RIB consumes resources of both the RIB and client processes, which may create performance issues as the number of client protocols increase and the number of routes maintained increase due to increased number of nodes using a particular routing protocol or other factors. Desired are new mechanisms to provide route updates to the clients.

SUMMARY

Disclosed are, inter alia, methods, apparatus, data structures, computer-readable medium, mechanisms, and means for maintaining and distributing relevant routing changes to subscribing clients in a device, such as, but not limited to a router, packet switching, or other communication and/or computing device. One embodiment receives a set of addresses from a client indicating route updates of interest to the client and a set of types of routing changes that are of interest, and populates one or more data structures accordingly with this information. In response to receiving a route update, one or more lookup operations are performed on the data structure to identify whether this particular route is of interest to a particular client and/or whether any route dependent on the particular route are of interest to a client. The client is notified of the changes of interest. In one embodiment, the type of change to a route is also matched against a set of types of routing changes that are of interest, and a client is only notified if the change to a route of interest also matches a type of routing change of interest. Examples of the extensible types of routing changes for a route may include, but are not limited to a change in a nexthop address, a change in a nexthop address interface, a change to a path to reach the route, a change in whether the route is directly reachable or not, a change in a distance to reach the route, a change in a cost to reach the route, or a change in another metric or routing information.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
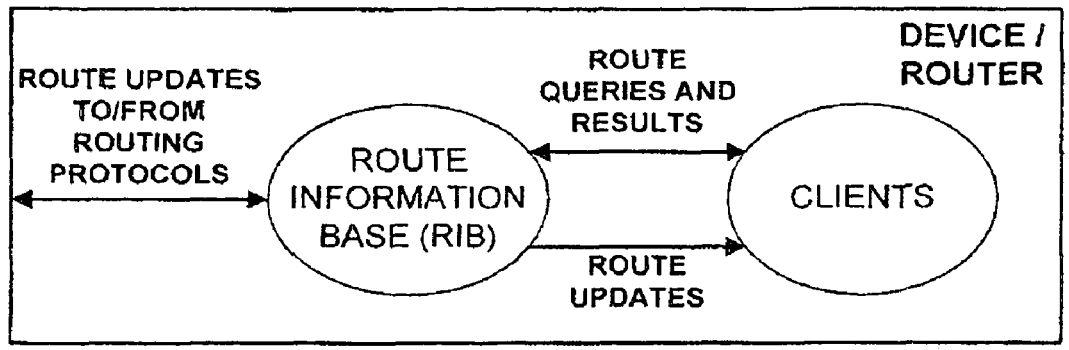
FIG. 1 is a block diagram illustrating a prior art system with clients querying a routing information base (RIB) for current routing information.

Disclosed are, inter alia, methods, apparatus, data structures, computer-readable medium, mechanisms, and means for maintaining and distributing relevant routing information base updates to subscribing clients in a device, such as, but not limited to routers, packet switching systems, and other communication and/or computing devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "address" is typically used herein to refer to an identification value of a device, network, other entity, or portion thereof. For example, when hierarchical network addresses are used, an address can refer to a prefix (e.g., the IP address of 10.0.0.*) or a fully-specified address (e.g., the IP address of 10.0.0.44). Also, an address (e.g., a prefix or fully-specified address) can be represented by a prefix and a length values. A "route" or "path" are typically used herein to refer to a way to get between a first node and a second node (e.g., a communications or computing device, router, other entity or portion thereof). There may be intermediate nodes between the first and second nodes, and there may be multiple routes or paths between two nodes. Also, "to route" typically refers to the identification of a route or path or the sending of information (e.g., a packet) through a network, path, or device.

In one embodiment, a route can be identified by the combination of a destination address, a nexthop address (i.e., the address of the next node to traverse to reach the destination or the destination itself), and an outgoing interface identification from which to send the information to reach the nexthop; while in one embodiment, a route can be identified by a single address or series of addresses and/or other values. In one embodiment, the outgoing interface identification value is null or another specific value to identify that the nexthop address is not directly reachable from the local node. In one embodiment, another indication mechanism (e.g., a flag or other value) is used to identify whether the nexthop address is directly reachable or not. In one embodiment, a series of route lookup operations (also sometimes referred to as recursive lookup operations) are performed on one or more data structures to identify a route between the starting and destination nodes. In one embodiment, a lookup operation is performed based on the destination address to return a route. If the identified nexthop address is not directly reachable, then a lookup operation is performed based on the returned nexthop address, and so on until a nexthop address is directly reachable.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc. The term "notify" typically is used generically to describe any manner or mechanism for directly or indirectly informing an entity of something using any communications mechanism.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

One embodiment distributes routing information within a router or other device. A set of addresses from a client indicating route updates of interest to the client are received, and used to populate one or more data structures. In response to receiving a route update, one or more lookup operations are performed on the one or more data structures to identify whether or not the routing update is of interest to one of its clients, and if so, the corresponding interested client or clients are notified of the particular route update (while clients not interested in the update are typically not notified of the routing update). In one embodiment, the route update corresponds to a registered address of interest or an update to a route upon which a registered address of interest depends.

In one embodiment, a set of types of routing changes that are of interest (e.g., routing attributes) are received and maintained in the one or more data structures; and a client is only notified if both the route update is of interest to the client and is of a type of routing change of interest. Such types of routing changes typically may include, but are not limited to a change in an interface for reaching an address of interest, a change in a path to an address of interest, a change in whether an address of interest is directly reachable or is not directly reachable, a change in a distance to reach an address of interest, a change in a cost metric to reach an address of interest, etc. Depending on the embodiment, these types of routing changes are maintained on a per address, per client, per address per client, per system, or on another basis. In one embodiment that maintains the types of routing changes of interest on a per system or per address basis, a client may receive an update in which it is not interested.

In one embodiment, a relevant route update mechanism informs a client of only route updates that are of interest to that client. Thus, in one embodiment, a relevant route update mechanism maintains information related to the routing information pertinent to its clients. These clients may be any entity, such as, but not limited to protocol, application, forwarding engine, and/or any other process.

The relevant route update mechanism typically maintains a data structure indicating those routes of interest for each of the clients. Different embodiments use different techniques for maintaining this information. For example, one embodiment maintains a separate data structure for each client in order to identify which client needs notification in response to a particular route change. One embodiment maintains indications for particular routes of which client(s) to notify in response to a change. One embodiment uses multiple instances of a relevant route update mechanism, such as one for each client. Additionally, one embodiment maintains additional information to identify types of changes which are of interest to one of the clients. For example, a client may be interested if the reachability information changes (e.g., changes in nexthop address or interface), a distance value changes, or some other routing characteristic, address, value, metric, etc. changes. This information may be maintained on a per address, per client, per address per client, per system, or on another basis.

In one embodiment, clients register with a relevant route update mechanism for change notification on routing information to particular addresses. Note, the number of addresses a client can register can be small or even quite large. For example, a client such as PIM often needs to register several rendezvous point (RP) and thousands or tens of thousands source addresses. Relevant route update mechanism monitors route updates for changes affecting the addresses registered by its clients and if there is a change, sends an immediate notification to affected clients in response to the detected change.

In one embodiment, for each address, a relevant route update mechanism typically sets up an entry and annotates it with client information (e.g., routing attributes, types of routing changes of interest, etc.). The relevant route update mechanism then queries the RIB for a route to this address, and if a route is recursive, keeps querying the RIB until a route is resolved. It then returns the routing information to the client. While doing the route resolution, relevant route update mechanism also creates entries for each route along the path (e.g., even addresses not registered as addresses of interest) and sets up dependency information among the entries.

This client information allows a client to specify to the relevant route update mechanism the types of routing changes that are of interest to the client. Examples of the possible client information include, but are not limited to directly connected nexthop IP address, interface to reach the nexthop, route matrix, route distance, and routing protocol which provides the route. Based on the routing attributes a client selects, relevant route update mechanism sets up the notification policy for this client. This allows clients to be notified not only based on changes to routes for addresses of which they are interested, but also only for changes in routing attributes for addresses of interest with these changes having corresponding specified or default type of routing change. This is an extensible policy based scheme, and thus a policy can be on a per client, per address, per client/per address, or on any other basis desired for the particular embodiment.

In one embodiment, a relevant route update mechanism maintains an index or other indication of the client or clients that are interested in an address, so multiple clients can register interest to the same or different addresses. Of course, there are an unlimited number of ways (e.g., sets, lists, arrays, matrices, bitmaps, etc.) to maintain such correspondence between an address and the client(s) (and vice versa) that are interested in routing changes associated with the address. Also, one embodiment maintains a reference count for each entry for ease of identifying when an entry is no longer of interest to any client.

In one embodiment, a client first does a bind to establish a context specific to this client inside relevant route update mechanism (e.g., connection information for communication with a client in another process, or a function callback specified by the client). During this binding process, the relevant route update mechanism also allocates a client handle for this client. This client handle uniquely maps to and essentially reserves a bit location in the client bitmap structure. Each entry contains a client bitmap to associate the entry with the set of clients owners. An entry is owned by two or more clients if more than one bit in the bitmap is set. Likewise, an entry is no longer in use and should be deleted if all bits in the bitmap are cleared. When there is a route update which results in the routing information change for an address, relevant route update mechanism uses the bitmap structure to determine to which clients should be sent the notification.

In one embodiment, a relevant route update mechanism checks every route update for relevance using its one or more databases. If a route update is an add/change event or a delete event to an existing route, relevant route update mechanism searches its data structure, and if the update is not relevant, the update is simply ignored. Otherwise, it determines which addresses are affected by this update and notifies the corresponding clients who have registered interest in this address. If notification is in the form of an interprocess communication (IPC), route updates for each client can be aggregated for efficiency. Relevant route update mechanism can be implemented, for example, as part of the RIB functionality or part of the functionality of a protocol process.

In one embodiment, a relevant route update mechanism is optimized to keep only the necessary routes to derive routing information changes for addresses of interest. This may include resolving a route if it is recursive and creating a database entry for each route used in the resolution process.

In one embodiment, entries are stored in a radix tree so a matching address can be quickly identified in response to receiving a routing update. To track route dependency, each entry keeps a dependent queue (e.g., a list of dependent addresses/entries). When an update affects a particular route, all the dependent entries/addresses are re-resolved/updated. If this results in any change to the routing information for a registered address, the corresponding client or clients are notified. Using dependent queues (or other dependency identification mechanism), the relevant route update mechanism can quickly locate any routing attribute changes to any address in the one or more databases, and thus triggers a notification message to the client or clients.

One embodiment of a relevant route update mechanism supports multiple routing sources, which is typically a desirable feature for some clients, such as, but not limited to multicast protocols. Typically for a multicast protocol, there can be multiple sources of unicast reachability information, such as, but not limited to static multicast specific unicast routes, unicast IGP/BGP routes, and multicast specific IGP/EGP routes. A relevant route update mechanism may serve as a central source of routing information to its clients by arbitrating between multiple routing sources.

Before turning to the figures, it is important to remember and to keep in context that described herein are many different aspects of one or more of the many different and extensible embodiments. Of course, the specific features and implementation details may vary among implementations of the same or different embodiments, especially in response to the needs of a particular application (e.g., protocol client, the device capabilities, etc.), and even on such factors as the design preferences of the person implementing an embodiment.

The relevant route update mechanism typically receives more route updates than are of interest to a client. For example, FIG. 2 illustrates one embodiment in which relevant route update mechanism 210 receives route updates 223 from one or more routing databases 220, which may or may not be the same as or similar to, or include the route information base shown in FIG. 1.

Although it is not required, one embodiment typically receives updates from the RIB, as it is currently the repository for most route information from a number of sources and it is updated with route changes. In one embodiment in which all routing information is not available from the RIB or other main routing information source, route updates 223 are received from multiple routing databases 220, and typically routing queries and results 222 are communicated with these multiple routing databases 220.

Figure 2:
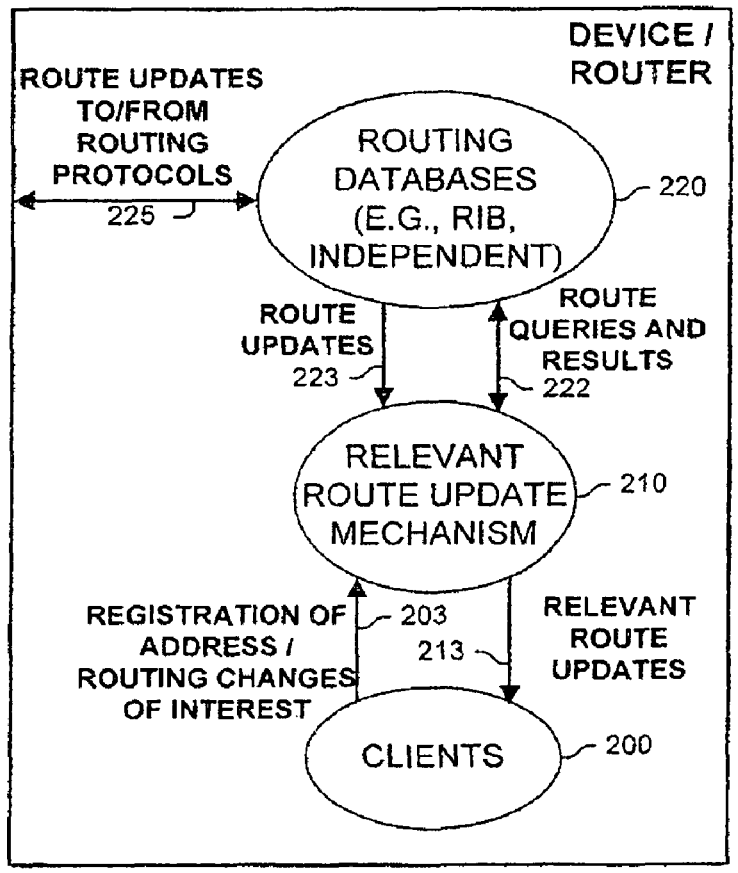
FIG. 2 is a block diagram illustrating an exemplary system wherein clients subscribe to request updates relevant to specific routes and types of routing changes.

Shown in FIG. 2 are one or more clients 200, a relevant route update mechanism 210, and one or more routing databases 220. One or more clients 200 communicates via messages 203 with relevant route update mechanism 210 to register its subscription to receive route updates of interest, as well as to communicate which routes are of interest and possible relevancy parameters/types of routing changes of interest (e.g., notify on change in route, notify on change or reachability information, notify on change of nexthop address or interface, notify on change of hop distance, etc.).

One or more routing databases 220 communicate by sending and receiving route updates 225 to and from other devices to identify the routes between communication and end devices. Relevant route update mechanism 210 receives route updates 223 from one or more routing databases 220, with these route updates typically being all route updates identified by one or more routing databases 220. Relevant route update mechanism 210 processes these route updates 223 to typically filter out, or otherwise reduce some or all routes not of interest to a particular client, such that each of the clients 200 typically receives relevant route updates 213 (e.g., typically less than all of route updates 223 and typically only routes of interest to the particular client, or substantially only routes of interest to the particular client). In one embodiment, relevant route update mechanism 210 provides an event driven notification to clients when changes occur, and thus offers a scalable way for clients to quickly obtain up-to-date routing information.

Additionally, relevant route update mechanism 210 may communicate route query and result messages 222 to get and receive needed route information. For example, when a route of interest is registered, relevant route update mechanism 210 may need current routing information for this route and any intervening routes.

Figure 3:
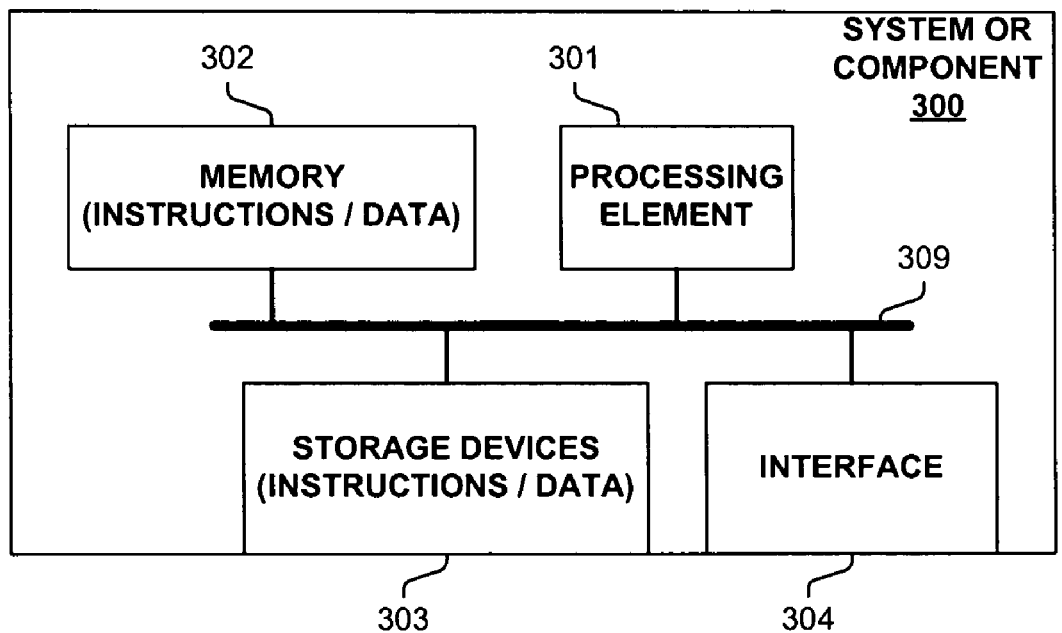
FIG. 3 is a block diagram of a system or component thereof, such as, but not limited to relevant route update mechanisms, RIBs, clients, or portions thereof and/or other processes used in one embodiment.

FIG. 3 is a block diagram of a system or component 300 thereof, for running one or more processes, such as, but not limited to relevant route update mechanisms, RIBs, clients, or portions thereof and/or other processes used in one embodiment. In one embodiment, system or component 300 performs one or more processes corresponding to one of the flow diagrams illustrated or otherwise described herein.

In one embodiment, component 300 includes a processing element 301, memory 302, storage devices 303, and an interface 304 for communicating information and/or sending packets, items, and/or other information, which are typically coupled via one or more communications mechanisms 309 (shown as a bus for illustrative purposes.) Various embodiments of component 300 may include more or less elements. The operation of component 300 is typically controlled by processing element 301 using memory 302 and storage devices 303 to perform one or more scheduling tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

Figure 4A:
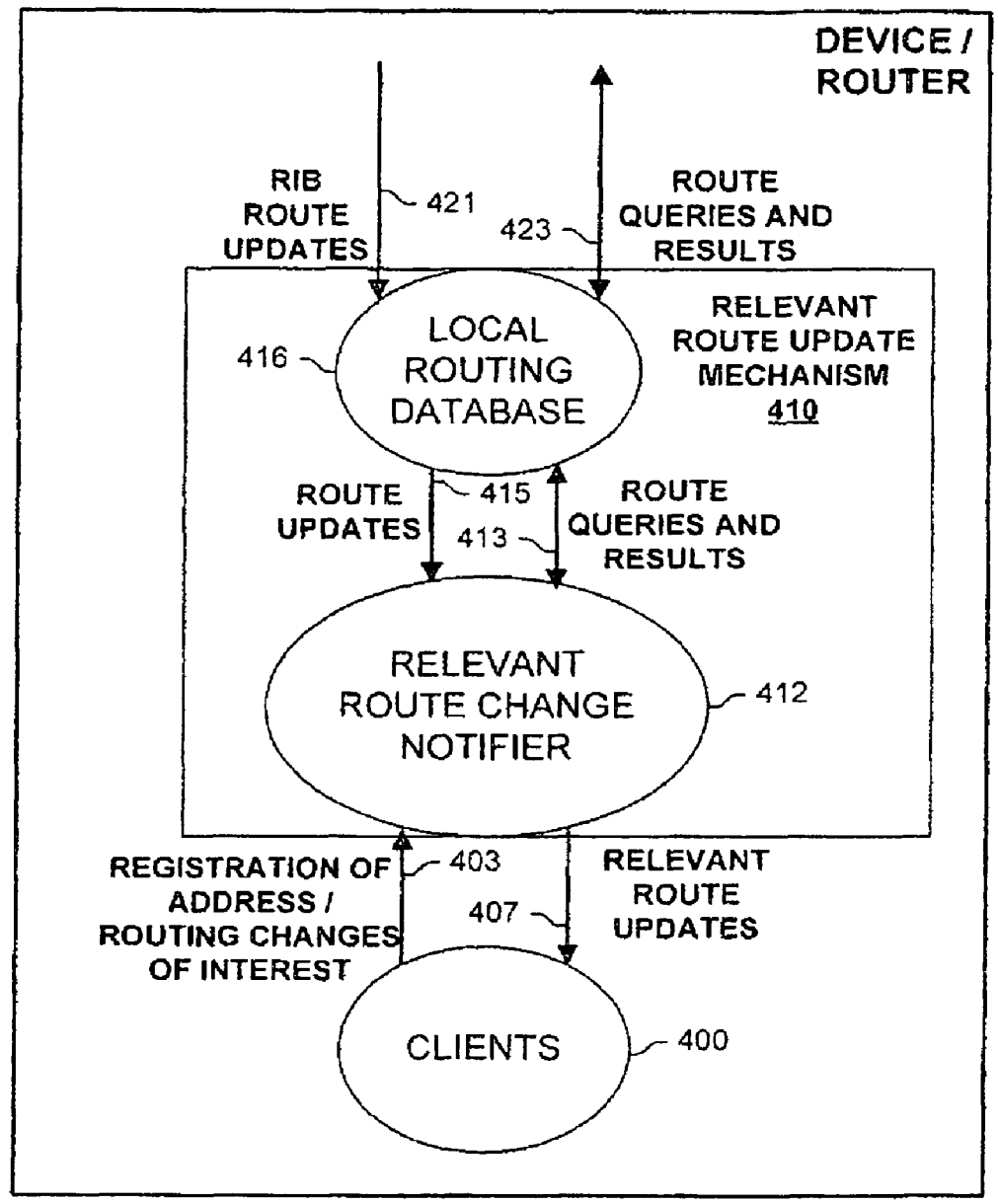
FIGS. 4A-C are block diagrams illustrating exemplary systems wherein clients subscribe to request updates relevant to specific routes and types of routing changes.
Figure 4B:
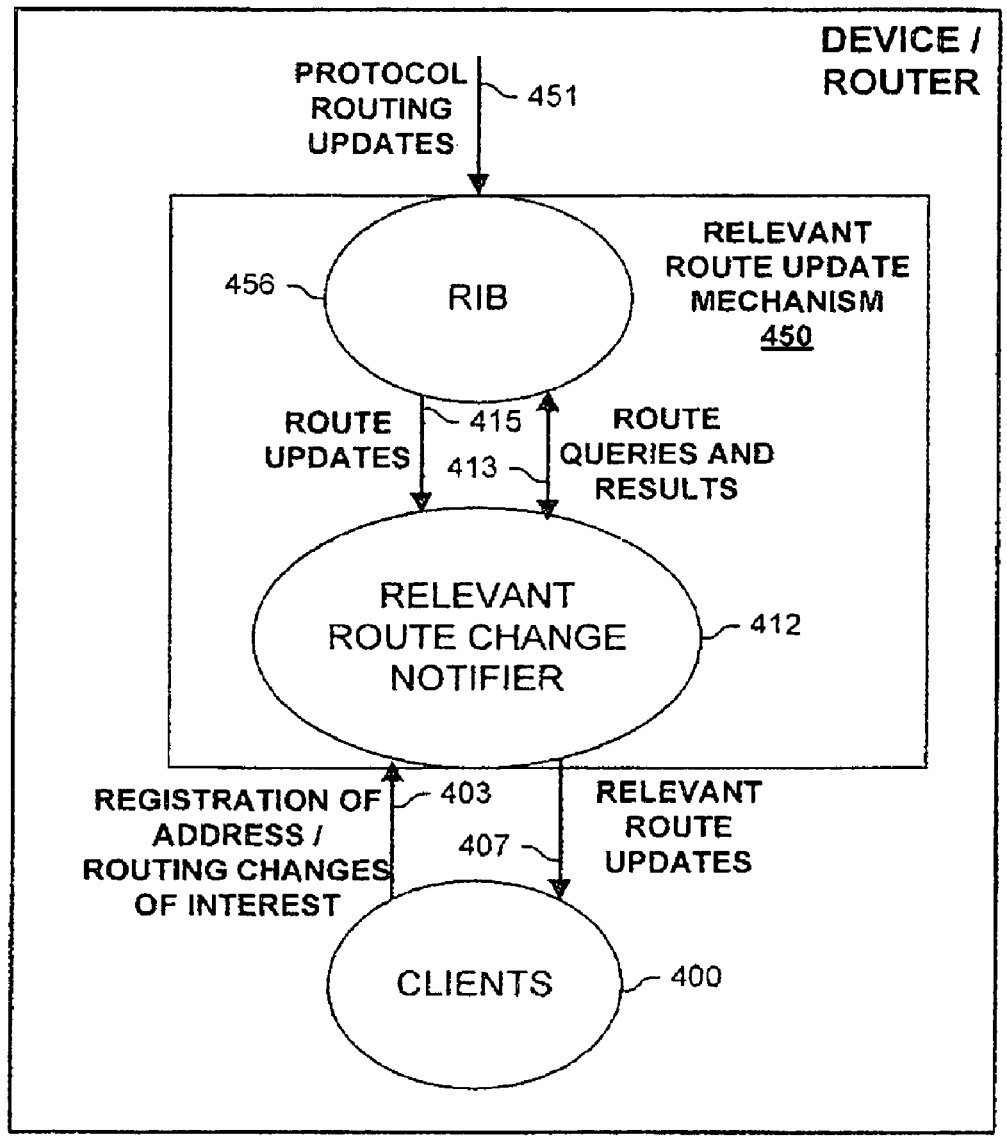
Figure 4C:
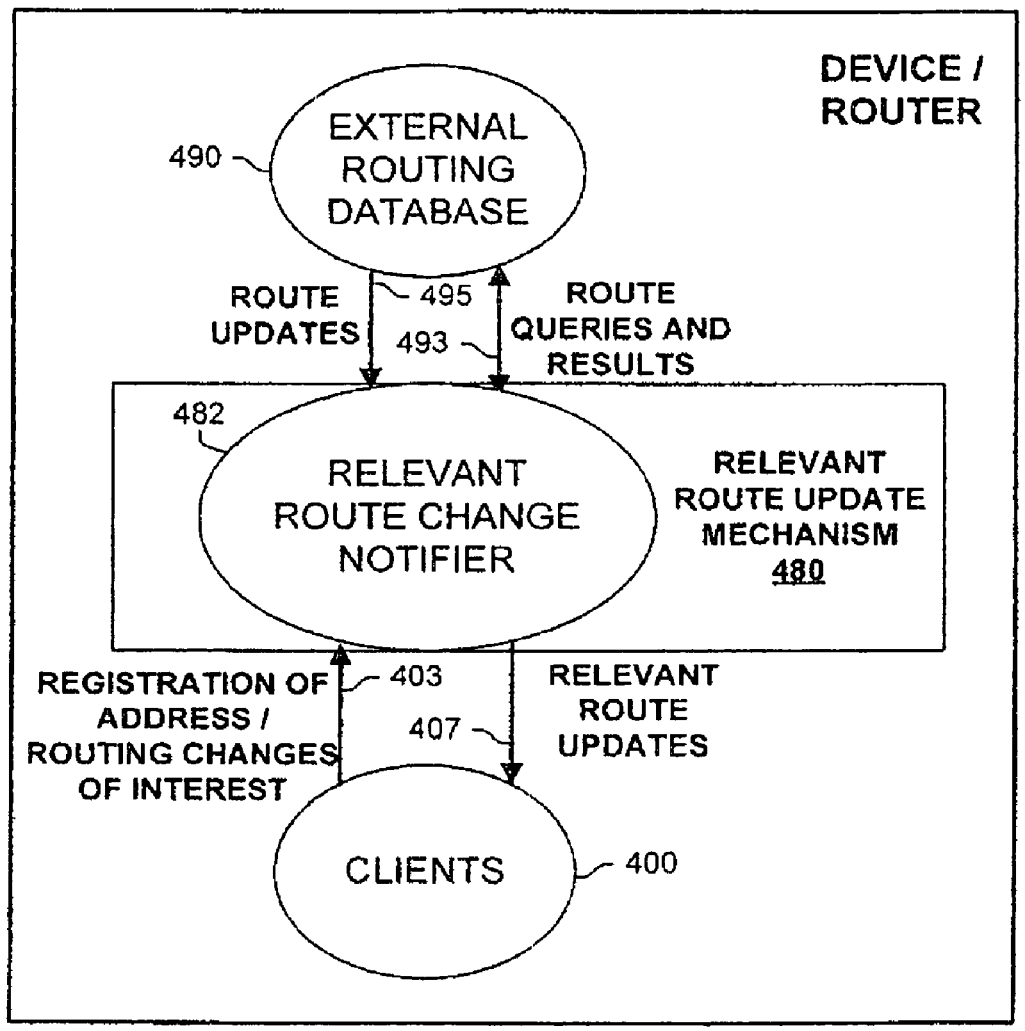

FIGS. 4A-C illustrate a few exemplary systems of an unlimited number of systems wherein clients subscribe to request updates relevant to specific routes and types of routing changes in accordance with the scope and spirit of the invention.

First, FIG. 4A illustrates a relevant route update mechanism 410 used in one embodiment. As shown, relevant route update mechanism 410 includes a local routing database 416, which may be a duplicate of a RIB or another routing database process. Local routing database 416 allows relevant route change notifier 412 to query local routing database 416 without using any resources of the original RIB or other routing database process. Of course, one embodiment does not include local routing database 416, but rather interacts with the original RIB or other routing database process.

In one embodiment, local routing database 416 receives RIB route updates 421 from an external RIB, Multicast Border Gateway Protocol (MGBP) process, or other routing database process. In one embodiment, local routing database 416 sends and receives queries and results 423 to and from an external RIB or other routing database process.

Relevant route change notifier 412 receives route updates 415 from local routing database 416, with route updates 415 typically being all route updates 421 received by local routing database 416.

One or more clients 400 subscribe to route update service with relevant route change notifier 412 via communication 403. Also, each of the one or more clients 400 communicate which routes are of interest and possible relevancy parameters/types of routing changes of interest (e.g., notify on change in route, notify on change or reachability information, notify on change of nexthop address or interface, notify on change of hop distance, etc.). Relevant route change notifier 412 then can filter or otherwise identify and send route updates 407 to a particular one or more clients, and typically only those route updates which are, or substantially are of interest to the particular one or more clients.

Relevant route change notifier 412 processes route updates 415 to typically filter out or otherwise reduce some or all routes not of interest to a particular client, such that each of the clients 400 typically receives relevant route updates 407 (e.g., typically less than all of route updates 421/415 and typically only routes of interest, or substantially only routes of interest). In one embodiment, relevant route change notifier 412 provides an event driven notification to clients when changes occur, and thus offers a scalable way for clients to obtain up-to-date routing information.

Additionally, relevant route change notifier 412 may communicate route query and result messages 413 to get needed route information. For example, when a route of interest is registered via signal 403, relevant route change notifier 412 may need to get routing information for this route and any intervening routes on which the registered address depends.

Next, FIG. 4B illustrates a relevant route update mechanism 450 including RIB 456 and relevant route change notifier 412. RIB 456 is updated based on protocol routing updates 451, and relevant route change notifier 412 notifies one or more clients 400 based on route updates 415 and route queries and results 413. Clients 400 subscribe to route update service with relevant route change notifier 412 via communication 403. Also, each of the one or more clients 400 communicate which routes are of interest and possible relevancy parameters/types of routing changes of interest (e.g., notify on change in route, notify on change or reachability information, notify on change of nexthop address or interface, notify on change of hop distance, etc.). Relevant route change notifier 412 then can filter or otherwise identify and send route updates 407 to a particular one or more clients, and typically only those route updates which are, or substantially are of interest to the particular one or more clients.

Next, FIG. 4C illustrates a relevant route update mechanism 480 including relevant route change notifier 482. As shown, relevant route update mechanism 480 does not include its own local RIB or other local database; rather relevant route change notifier 482 receives route updates 495 from external routing database 490, and optionally communicates route queries and results 493 with external routing database 490. Relevant route change notifier 482 notifies one or more clients 400 based on route updates 415 and route queries and results 413. Clients 400 subscribe to route update service with relevant route change notifier 412 via communication 403. Also, each of the one or more clients 400 communicate which routes are of interest and possible relevancy parameters/types of routing changes of interest (e.g., notify on change in route, notify on change or reachability information, notify on change of nexthop address or interface, notify on change of hop distance, etc.). Relevant route change notifier 412 then can filter or otherwise identify and send route updates 407 to a particular one or more clients, and typically only those route updates which are, or substantially are of interest to the particular one or more clients.

Figure 5A:
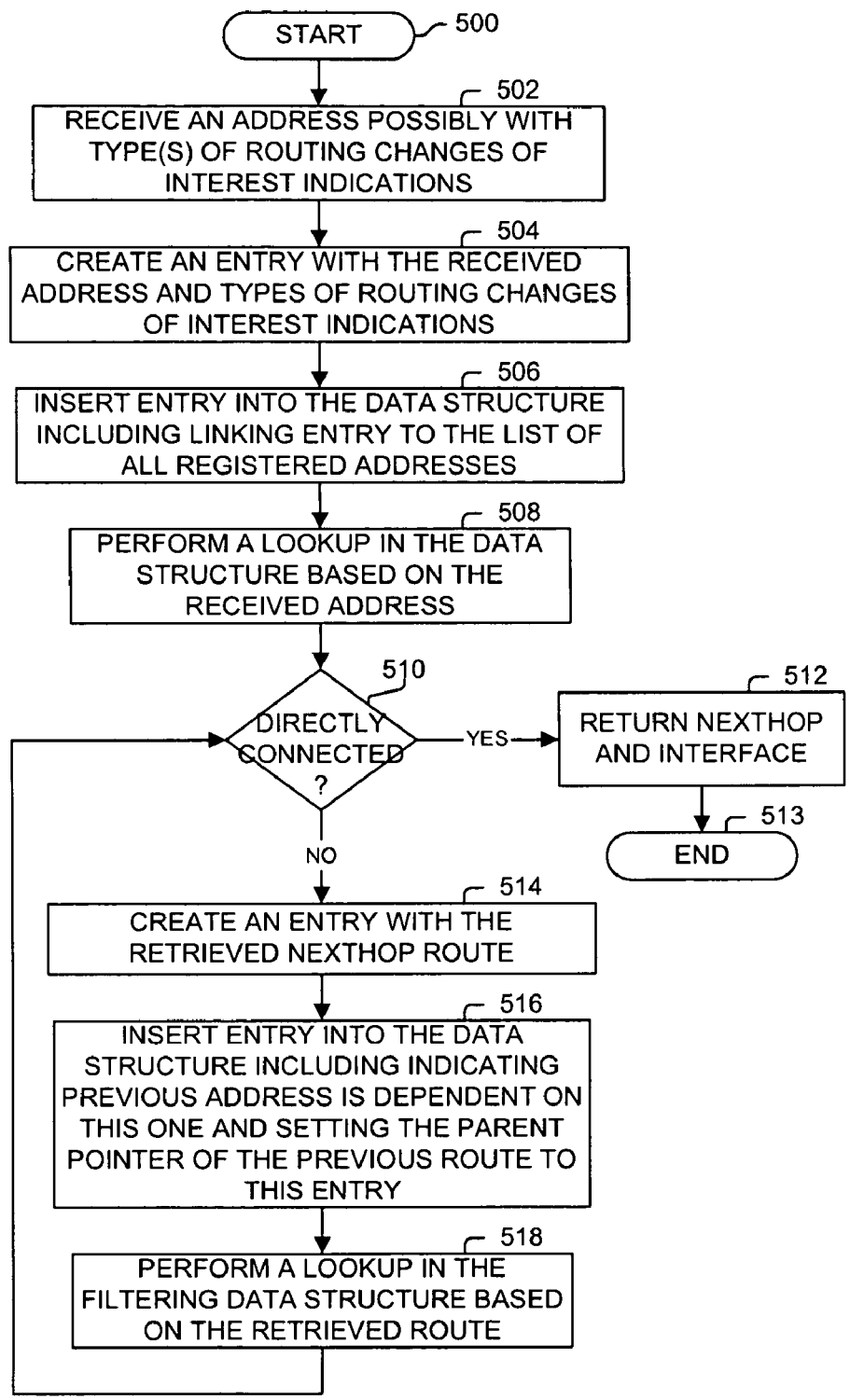
FIGS. 5A-C illustrate processes used in one embodiment for maintaining one or more data structures of specific routes and types of routing changes of which one or more clients are interested, and for processing route updates to identify whether a change of interest was made, and in response, notify the interested client or clients.
Figure 5B:
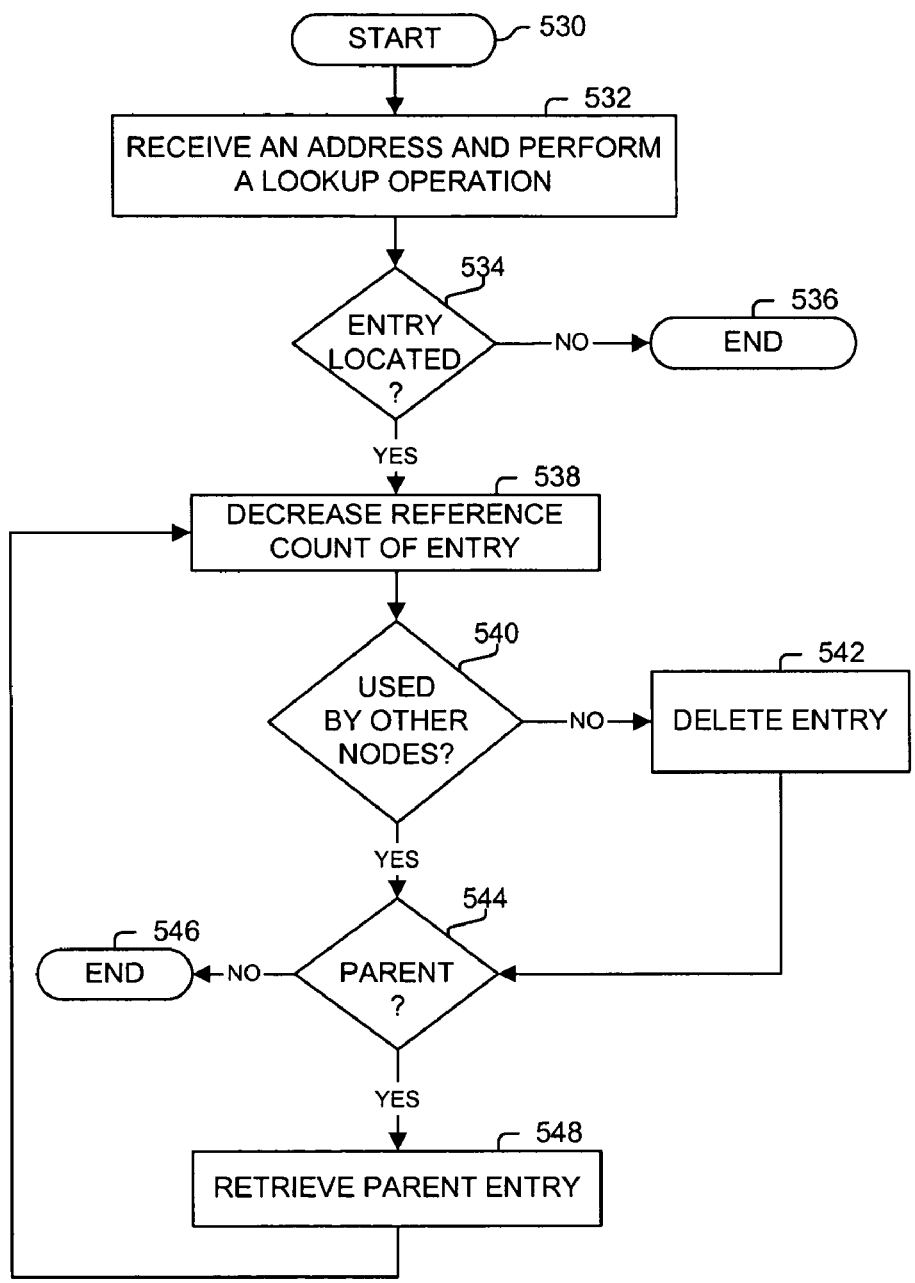
Figure 5C:
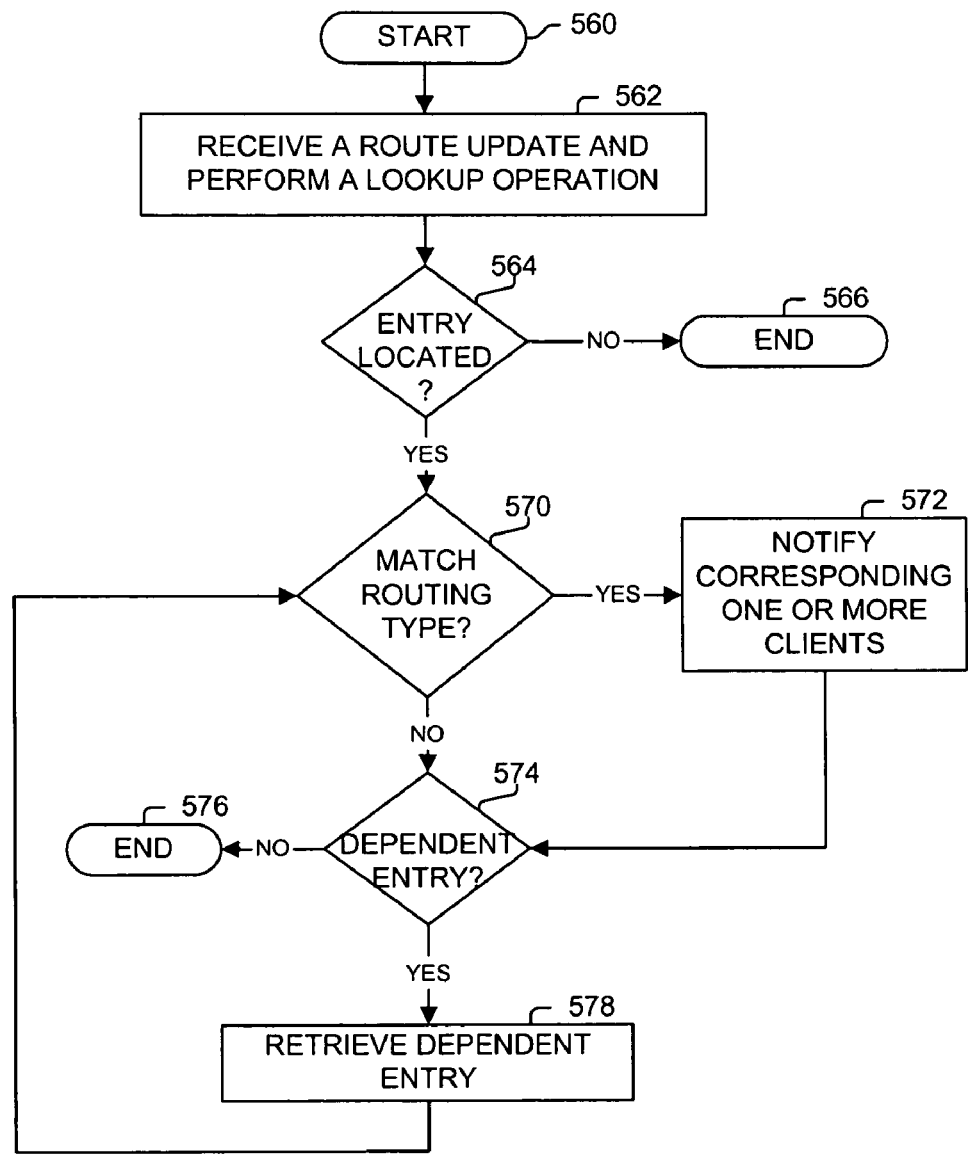

FIGS. 5A-C illustrate processes used in one embodiment for maintaining one or more data structures of specific routes and types of routing changes of which one or more clients are interested, and for processing route updates to identify whether a change of interest was made, and in response, notify the interested client or clients.

FIG. 5A illustrates a process used in one embodiment to receive and process a request for client notification of an address, possibly with types of route changes of interest. Processing begins with process block 500, and proceeds to process block 502, wherein a route of interest is received, possibly with an indication of one or more types of routing changes of interest. Next, in process block 504, an entry is created for the received address with the routing type indications. In process block 506, the entry is inserted into the data structure, including adding a linking entry in a data structure (e.g., radix tree) of all the registered routes of interest. In process block 508, a lookup operation is performed in the data structure based on the received address. As determined in process block 510, until a route is returned which is directly connected, an entry is created for the retrieved nexthop address in process block 514; the entry is inserted into the data structure with an indication of dependency on the previous address and a link to its parent in process block 516; a lookup operation is performed on the retrieved address in process block 518, and process returns to process block 510. When complete as determined in process block 510, then in process block 512, the nexthop value and interface to reach the nexthop are returned. Processing is complete as indicated by process block 513.

FIG. 5B illustrates a process used in one embodiment receive and process a request to no longer receive client notification of an address, possibly with types of route changes of interest. Processing begins with process block 530, and proceeds to process block 532, wherein a route of interest is received. As determined in process block 534, if an entry is not located, then processing is complete as indicated by process block 536. Otherwise, the reference count of the number of clients interested in the particular route is decreased. One embodiment uses such reference counts; while one embodiment does not. As determined in process block 540, if the entry is not used by other nodes (e.g., the reference count is zero or via another mechanism), then in process block 542, the entry is deleted. As determined in process block 544, if the entry has a parent entry, then in process block 548, the parent entry is retrieved, and processing returns to process block 538 to repeat this process based on the parent. Otherwise, processing is complete as indicated by process block 546.

FIG. 5C illustrates a process used in one embodiment to process a route update to identify if a notification indication should be sent, and if so, to which one or more clients. Processing begins with process block 560, and proceeds to process block 562, wherein a route update is received and a lookup operation is performed. As determined in process block 564, if an entry is not located, then processing is complete as indicated by process block 566. Otherwise, as determined in process block 570, if the route update corresponds to a specified type of routing change of interest, then in process block 572, the corresponding one or more clients are notified. In one embodiment, process block 572 is not performed and processing proceeds directly to process block 572 as types of routing changes are not used or they are ignored, and thus a notification message is sent for every matching route change of interest.

Returning to the processing illustrated in FIG. 5C, as determined in process block 574, if there are any dependent routes in the one or more data structures, then in process block 578, the dependent route is retrieved and processing returns to process block 570 to repeat this processing for each of the dependent routes. When there are no more dependent routes as determined in process block 574, processing is complete as indicated by process block 576.

Figure 5D:
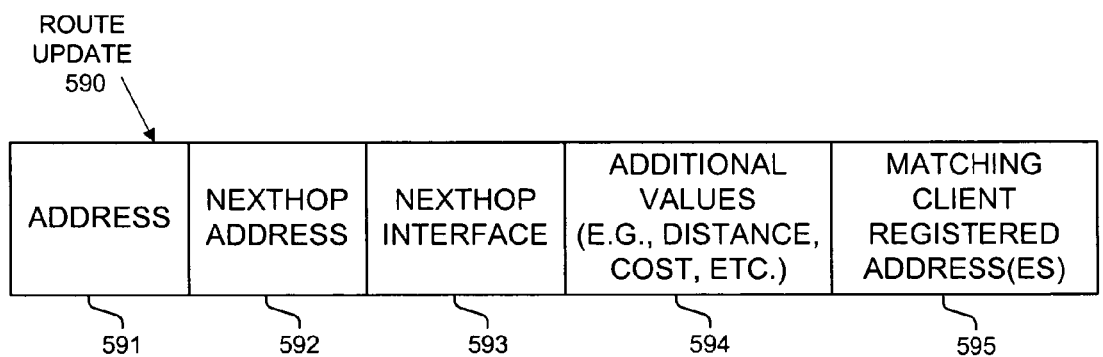
FIG. 5D illustrates a route update message used in one embodiment.

FIG. 5D illustrates a route update 590 used in one embodiment. As shown, route update 590 includes an address 591 and its corresponding nexthop address 592 and nexthop interface 593. In one embodiment, a route update message 590 including values 591-593 is received by a relevant route update mechanism from one or more routing databases. In one embodiment, a route update message 590 including values 591-593 is used to notify a client of a relevant route update. In one embodiment, route update message 590 includes some additional values (e.g., routing attributes, distance, costs, etc.) 594. In one embodiment, route update message 590 includes a set of one or more registered addresses 595 that matched the route update message 590 (i.e., for use in notifying a client of the route update and the reason for notification of the route update).

Figure 6A:
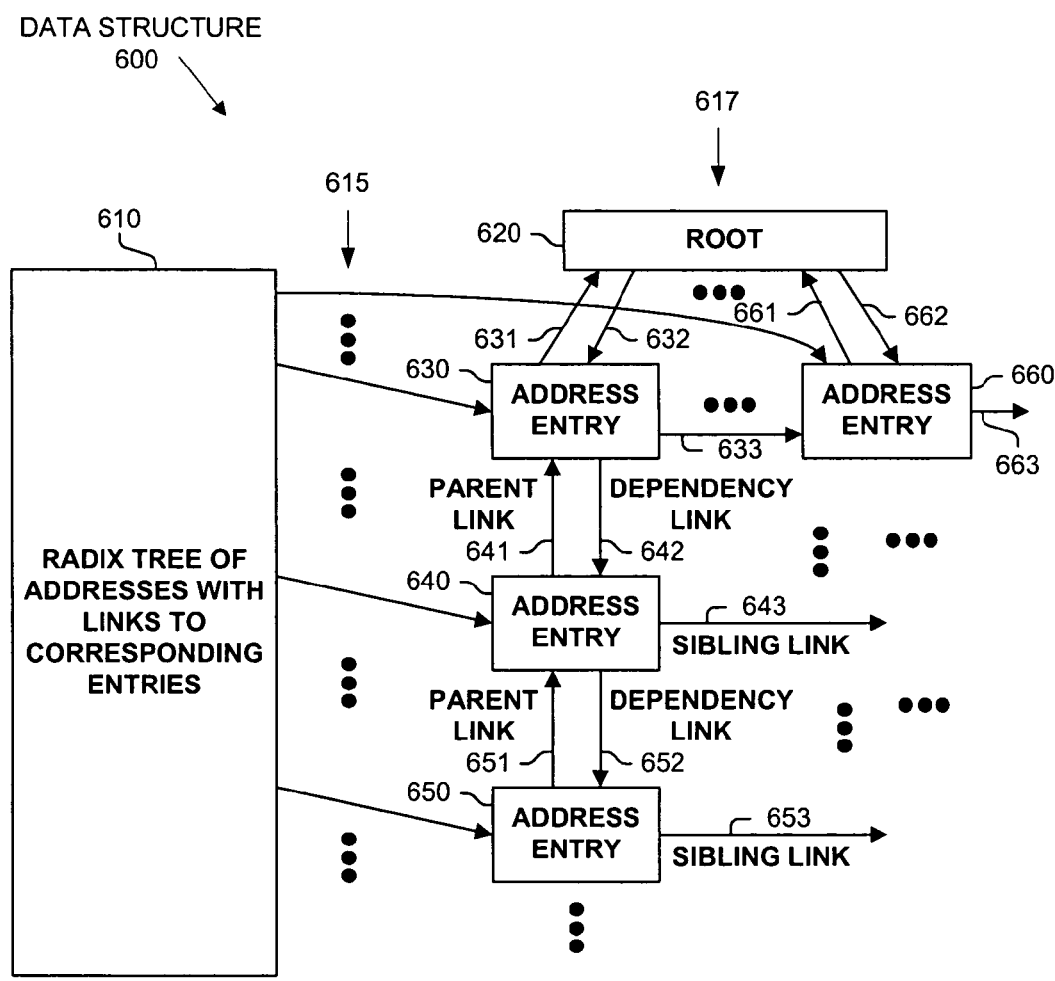
FIG. 6A is a block diagram illustrating a data structure used to maintain routing information in one embodiment.

FIG. 6A is a block diagram illustrating a data structure 600 used to maintain routing information in one embodiment. A radix tree 610 is used to maintain each registered route and each dependent route thereof. Radix trees are well known for storing addresses, and provide a quick and efficient way to identify a matching address during a lookup operation. Each entry in the radix tree 610 is linked (as indicated by pointers 615) to its corresponding entry in a second portion 617 of data structure 600.

The second portion 617 of data structure 600 maintains an indication of route dependencies, such that for a given route update, the corresponding affected registered addresses can be readily identified. Shown are root entry 620 and address entries 630, 640, 650 and 660, with their corresponding pointers 631, 641, 651, and 661 to their parent respective entries, their corresponding dependency links 632, 642, 652, and 662, and their corresponding links 633, 643, 653, 663 to their respective sibling entries. For example, if a route update corresponding to address entry 640 is identified, then one or more clients need notification based on the route update corresponding to address entry 640 and its dependent entry 650. Of course, there are an unlimited number of one or more data structures that can be used to maintain routing information.

Figure 6B:
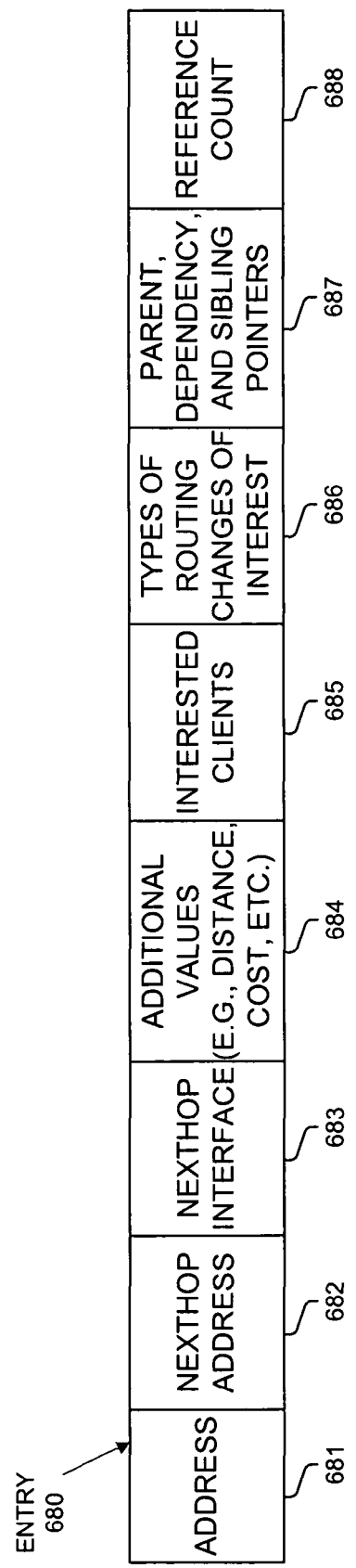
FIG. 6B is a block diagram illustrating fields included an entry of a data structure used to maintain routing information in one embodiment.

FIG. 6B is a block diagram illustrating fields included an entry 680 of a data structure used to maintain routing information in one embodiment. As show, entry 680 includes an address 681; a nexthop address 682; a nexthop interface 683; additional values 684 (e.g., current distance, cost, etc. for determining if there was a change resulting from the route update); an indication 685 of the interested clients (e.g., a list, bitmap, set, etc.); an indication 686 of the types of routing changes of interest; parent, dependency, and sibling pointers 687; and a reference count 688.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed within a router for distributing routing information within the router, the method comprising:
    receiving a set of addresses from a client indicating route updates of interest to the client and a set of types of routing changes that are of interest;
    maintaining one or more data structures including information corresponding to the set of addresses and the set of types of routing changes that are of interest;
    receiving a particular route update; and
    notifying the client of the particular route update in response to identifying the particular route update corresponds to both at least one address in the set of addresses and at least one routing attribute in the set of types of routing changes that are of interest;
    wherein the client is within the router.

2. The method of claim 1, wherein said at least one routing attribute includes a change in an interface for reaching an address in the set of addresses.

3. The method of claim 2, wherein said notifying the client of the particular route update includes notifying the client of the address.

4. The method of claim 1, wherein said at least one routing attribute includes a change in a path from the router to an address in the set of addresses.

5. The method of claim 4, wherein the address is directly reachable from the router.

6. The method of claim 1, wherein said at least one routing attribute includes a change in whether an address in the set of addresses is directly reachable or is not directly reachable.

7. The method of claim 1, wherein said at least one routing attribute includes a change in a distance to reach an address in the set of addresses.

8. The method of claim 1, wherein said at least one routing attribute includes a change in a cost metric to reach an address in the set of addresses.

9. A method performed within a device for distributing routing information within the device, the method comprising:
    receiving a first set of addresses from a first client indicating route updates of interest to the first client and a first set of types of routing changes that are of interest to the first client;
    receiving a second set of addresses from a second client indicating route updates of interest to the second client and a second set of types of routing changes that are of interest to the second client;
    maintaining one or more data structures including information corresponding to the first and the second sets of addresses and the first and the second sets of types of routing changes that are of interest;
    receiving a particular route update;
    performing one or more lookup operations on said one or more data structures to identify a result corresponding to the particular route update, the result identifying the first client but not the second client, and the particular route update corresponding to a particular type of routing change identified in the first set of types of routing changes that are of interest; and
    notifying the first client but not the second client of the particular route update in response to the result identifying the first client but not the second client and the particular route update corresponds to a particular type of routing change identified in the first set of types of routing changes that are of interest;
    wherein the first client and the second client are within the device.

10. The method of claim 9, wherein said one or more data structures maintains a single set of types of routing changes that are of interest to the first and the second clients based on the first and the second sets of types of routing changes that are of interest.

11. The method of claim 9, wherein said information maintained by said one or more data structures identifies different states of interest by clients, wherein said different states of interest include: whether the first client, the second client, both the first and second clients, and neither the first or second client are interested in a particular type of routing change.

12. The method of claim 11, wherein a single indication of said different states of interest by clients is maintained for all of the addresses in the first and second sets of addresses.

13. The method of claim 11, wherein an indication of said different states of interest by clients is maintained for each address of said first and second sets of addresses.

14. A method performed within a device for distributing routing information within the device, the method comprising:
    maintaining a data structure of route dependencies including routes of interest to one or more clients;
    receiving a routing update identifying a particular route;
    identifying that no client of said one or more clients has subscribed to receive an update corresponding to the particular route;
    identifying a second particular route dependent on the particular route;
    identifying a particular client of said one or more clients has subscribed to receive an update corresponding to the second particular route; and
    notifying the particular client of the update to the particular route in response to said identifying the particular client has subscribed to receive an update corresponding to the second particular route;
    wherein said one or more clients are within the device.

15. The method of claim 14, comprising identifying a change corresponding to the second particular route matches a types of routing changes that are of interest to the particular client; and wherein said notify the particular client is performed in response to said identifying the particular client has subscribed to receive an update corresponding to the second particular route and said identifying the change corresponding to the second particular route matches a types of routing changes that are of interest to the particular client.

16. An apparatus for distributing routing information within a device, the apparatus comprising:
    means for receiving a set of addresses from a client indicating route updates of interest to the client and a set of types of routing changes that are of interest;

means for maintaining one or more data structures including information corresponding to the set of addresses and the set of types of routing changes that are of interest;

means for receiving a particular route update; and means for notifying the client of the particular route update in response to identifying the particular route update corresponds to both at least one address in the set of addresses and at least one routing attribute in the set of types of routing changes that are of interest;

wherein the client is within the apparatus.

17. A device comprising one or more processors and a memory, wherein the memory stores one or more instructions that, when executed by said one or more processors, perform the operations of:

receiving a set of addresses from a client indicating route updates of interest to the client and a set of types of routing changes that are of interest;

maintaining one or more data structures including information corresponding to the set of addresses and the set of types of routing changes that are of interest;

receiving a particular route update; and notifying the client of the particular route update in response to identifying the particular route update corresponds to both at least one address in the set of addresses and at least one routing attribute in the set of types of routing changes that are of interest;

wherein the client is within the device.

18. A method performed within a router for distributing routing information within the router, the method comprising:

receiving a set of addresses from a client indicating route updates of interest to the client;

identifying at least one dependent route on which an address in the set of addresses is dependent;

maintaining one or more data structures including information corresponding to the set of addresses and said at least one dependent route;

receiving a particular route update corresponding to a particular route of said at least one dependent route; and notifying the client of the particular route update in response to identifying the particular route update corresponds to the particular route of said at least one dependent route;

wherein the client is within the router.

19. The method of claim 18, wherein said identifying the particular route update corresponds to the particular route of said at least one dependent route includes performing one or more lookup operations on said one or more data structures to identify one or more entries, wherein at least one of said one or more entries identifies that the client is interested in a change in said at least one dependent route.

20. A device comprising one or more processors and a memory, wherein the memory stores one or more instructions that, when executed by said one or more processors, perform the operations of:

receiving a set of addresses from a client indicating route updates of interest to the client;

identifying at least one dependent route on which an address in the set of addresses is dependent;

maintaining one or more data structures including information corresponding to the set of addresses and said at least one dependent route;

receiving a particular route update corresponding to a particular route of said at least one dependent route; and notifying the client of the particular route update in response to identifying the particular route update corresponds to the particular route of said at least one dependent route;

wherein the client is within the device.

21. The device of claim 20, wherein said identifying the particular route update corresponds to the particular route of said at least one dependent route includes performing one or more lookup operations on said one or more data structures to identify one or more entries, wherein at least one of said one or more entries identifies that the client is interested in a change in said at least one dependent route.

22. An apparatus for distributing routing information within a device, the apparatus comprising:

means for receiving a set of addresses from a client indicating route updates of interest to the client;

means for identifying at least one dependent route on which an address in the set of addresses is dependent;

means for maintaining one or more data structures including information corresponding to the set of addresses and said at least one dependent route;

means for receiving a particular route update corresponding to a particular route of said at least one dependent route; and means for notifying the client of the particular route update in response to identifying the particular route update corresponds to the particular route of said at least one dependent route;

wherein the client is within the apparatus.

23. The apparatus of claim 22, wherein said means for identifying the particular route update corresponds to the particular route of said at least one dependent route includes means for performing one or more lookup operations on said one or more data structures to identify one or more entries, wherein at least one of said one or more entries identifies that the client is interested in a change in said at least one dependent route.

* * * * *